United States Patent Office 3,407,083
Patented Oct. 22, 1968

3,407,083
PROCESS FOR PREPARING INSULATION
BOARD ADHESIVE
Harlan E. Tarbell and Donald W. Mogg, Elizabethton, Tenn., assignors, by mesne assignments, to Grefco, Inc., Philadelphia, Pa., a corporation of Delaware
No Drawing. Filed May 21, 1965, Ser. No. 457,804
3 Claims. (Cl. 106—152)

ABSTRACT OF THE DISCLOSURE

A process for preparing a water-oil-emulsion comprising forming an aqueous dispersion of starch-containing material; then separately forming an non-aqueous solution of a bitumen and thoroughly mixing the dispersion with the solution. The resulting emulsion comprising on a weight basis, 40–70 parts bitumen, 5 to 50 parts water-immiscible organic liquid, 1 to 5 parts net starch and 10 to 40 parts water.

---

It is of course well known to use bitumens such as asphalts and pitches in adhesive formulations. Yet in some current high volume applications, their use still raises problems and inconviences which at times can be fairly serious.

In the insulation board field for example, when asphalt is used as the adhesive for securing the insulation board to the deck of a roof, it is conventionally applied to the deck by hot mop process. The solid asphalt is first melted and then spread over the surface of the deck with a mop. It is thus necessary to invest in heating equipment and to wait for the asphalt to melt, two operations with which the average building contractor can very well dispense. Furthermore, the very mechanics of these operations result in the net deposition of quantities of asphalt far in excess of that needed for adhesion of the board to the roof. Given the flammable nature of this particular organic adhesive, there may result, in case of fire, excessive spread of flames throughout the building.

Cut-back asphalt, i.e. asphalt blended with petroleum solvents, might be used to some advantage in eliminating some of the shortcomings of the hot mop process. But then, the improvements that can be achieved are depreciated radically by the high sorption rate of the asphalt solution into the board. A very weak bond is produced.

On the other hand, to use starch dispersions alone to bond porous materials such as roof insulation board not only produces a rather poor bond but also is subject to the further disadvantage that the bonding agent, starch, can be washed off with water.

An object of this invention, therefore, is to provide a process for preparing bitumen base adhesives that can be applied at ambient temperatures to yield maximum bond strength for a given quantity of material used. Another object is to provide a process for preparing adhesive formulations that will remain on the surface of porous substrates and thus be available for their bonding function.

These and other objects which will become apparent on further familiarization with the description of the present invention, have been accomplished by emulsifying a water dispersion of a starch or a related material, into a non-aqueous solution of a bitumen. Cut-back asphalts have been found to serve satisfactorily as the continuous phase of these emulsions.

It has been discovered that the compositions presently of interest penetrate porous materials sufficiently to form good bonds, for instance between insulation board and roof deck, and yet are not excessively adsorbed and presorbed by the porous materials. This delicate and unexpected control of substrate penetration is a novel feature that is believed to be intimately concerned with a measured opposition of the permeabilities of the two liquid phases present.

The following examples will further illustrate the invention. They are not to be construed however as a limitation thereto.

Example 1

| | Parts by weight |
|---|---|
| Asphalt (softening point 140–145° F.) | 43 |
| VM & P naphtha (flash point 60° F.) | 23 |
| Hoosier pearl starch | 3 |
| Water | 31 |
| Cationic amine wetting agent | Trace |

The naphtha was blended with the asphalt. The starch was mixed in the water and heated to 190–195° F. for five minutes with stirring and the Redicote E wetting agent was added. The whole was mixed with a No. 30 Hamilton-Beach mixer.

This adhesive bonded glass fiber, perlite, vegetable fiber and urethane insulation boards to metal with a bond which was found to be, in each case, stronger than the board itself.

Example 2

| | Parts by weight |
|---|---|
| AC–8 asphalt | 100 |
| Mogul B211 starch-gluten blend | 7.5 |
| Water | 42.5 |
| CTS–1 ball clay | 1.0 |

AC–8 asphalt is a product of Hunt Petroleum Company. It contains, on a weight basis, 62% asphalt having a softening point of 190–195° F. and 38% naphtha with a 200–400° F. boiling range. Mogul B211 is sold by Corn Products Sales Company. It is a pre-gelatinized starch-gluten blend which contains between 2.5 and 5% protein. CTS–1 ball clay, a product of Kentucky-Tennessee Clay Company, is a material that does not swell in water and is finely divided to the extent that about 89% of its weight consists of particles having a diameter smaller than 2 microns.

To prepare the emulsion, the starch and clay were mixed into the water and the whole mixed with the cut-back asphalt using a No. 30 Hamilton-Beach mixer.

This material when used as an adhesive to bond perlite, urethane, vegetable fiber, or glass fiber insulation board to galvanized steel and dried, bonded so strongly that when the resulting structures were subjected to a tensile pull, failure occurred in the boards and not at the adhesive bonds.

Example 3

| | Parts by weight |
|---|---|
| Asphalt | 65 |
| Naphtha | 35 |
| Canary S dextrine | 15 |
| Water | 35 |

The asphalt and the naphtha used were those of Example 1. Canary S dextrine is a product of Stein Hall Company. It is prepared by the action of hydrochloric acid on starch in the presence of steam.

As usual, the naphtha was blended with the asphalt. The dextrine was dissolved in the water. The dextrine solution was then dispersed into the asphalt solution by means of a No. 30 Hamilton-Beach mixer.

The resulting emulsion proved to be an excellent adhesive when tested for bonding insulation board to metal as in the previous examples.

Example 4

A poor bond, i.e., a bond that failed on exerting tensile pull on an insulation board-metal structure bonded by the adhesive resulted when said adhesive was an emulsion prepared as in Example 3 with the difference that only 7.5 parts of the dextrine was used rather than 15 parts.

Example 5

| | Parts by weight |
|---|---|
| Koppers coal tar pitch (s.p. 104–122° F.) | 43 |
| Toluene | 17 |
| Wheat flour | 14 |
| Water | 26 |

The pitch was dissolved in the toluene and the flour dispersed in the water. The aqueous flour suspension was then blended into the pitch solution by means of a No. 30 Hamilton-Beach mixer.

The resulting emulsion proved to be an excellent adhesive for porous materials such as roof insulation board. When tested as in Example 1, porous board structures broke in the board rather than at the bond.

Bitumens that can be used in formulating the adhesive compositions of this invention include materials such as asphalt, gilsonite, petroleum pitch, wood tar pitch, lignite tar pitch, coal tar pitch and mixtures thereof. These materials may contain minor quantities of polymeric substances such as reclaimed rubber or polyethylene, said polymers being at times added to commercial products of this type to improve their properties. The actual bituminous substance selected should have a softening point within the range of 100 to 400° F., preferably between 120 to about 250° F. for most applications. The bitumen is blended with a solvent that is substantially immiscible with water. Under certain use circumstances, factors such as fire hazard and toxicity may have to be considered. With this in mind, there can be employed as solvents hydrocarbons, halogenated hydrocarbons and so on. Illustrative members of these classes include toluene, carbon tetrachloride, trichloroethylene, perchloroethylene and petroleum naphthas—the latter having a boiling point preferably within the range of 200–400° F., although petroleum fractions boiling as low as 100° F. can be used where quick drying is desired.

The aqueous dispersion or solution of starch material which constitutes an essential part of our emulsified bitumen adhesives can be made with a pure starch, a degraded starch, a mixture of starch with other natural products or glycogen. Among natural materials of this type are included corn starch, potato starch, rice starch, starch-gluten mixtures, cereal flours, dextrines and so on. Mixtures of starch with other materials such as proteins or sugars, should contain at least 20% starch by weight preferably. The adhesive emulsions of our invention are further characterized by having the following composition, on a weight basis: 40 to 70 parts bitumen, 5 to 50 parts water-immiscible inert organic liquid, 1 to 5 parts starch and 10 to 40 parts water. When an impure or partially degraded starch is used, such as the starch-gluten mixture of Example 2, the carbohydrate content of the emulsion should be raised to a level of 5 to 20 parts by weight.

It is evident from the examples that other materials may be added in minor amounts to the present emulsions in order to accomplish special purposes, and this without distracting from the spirit of our invention. These minor components may variously affect such properties as mechanical stability, shelf life, ease of handling, and so on. The minor additives may include wetting agents, perservatives to prevent bacteriological or insect attack on the starch of the compositions, inert fillers or clays to help the adhesive formulations to clog the pores of the materials to be bonded and so on.

We claim:

1. A process for preparing a water-in-oil emulsion which consists in (a) forming separately an aqueous dispersion of a starch-containing material and a non-aqueous solution of a bitumen, and (b) thoroughly mixing the dispersion with the solution; the resulting emulsion comprising substantially, on an overall weight basis, 40 to 70 parts bitumen, 5 to 50 parts water-immiscible organic liquid, 1 to 5 parts net starch, and 10 to 40 parts water wherein the bitumen is selected from the group consisting of asphalt, gilsonite, petroleum pitch, coal tar pitch, wood tar pitch, and lignite tar pitch.

2. The bitumen emulsion made according to the process of claim 1.

3. The process of claim 1 wherein the starch material is selected from the group consisting of starch, glycogen and natural and modified mixtures containing at least about 20% starch.

References Cited

UNITED STATES PATENTS

| 1,881,729 | 10/1932 | Levin | 252—311.5 |
| 2,044,570 | 6/1936 | Hite | 106—152 |
| 1,969,659 | 8/1934 | McLaurin | 106—134 |
| 2,366,943 | 1/1945 | Treadway | 106—212 |
| 2,518,281 | 8/1950 | Camp | 106—212 |
| 2,932,579 | 4/1960 | Westlund | 106—278 |

FOREIGN PATENTS 251,323   5/1926   Great Britain.

OTHER REFERENCES

H. Araham: "Asphalts and Allied Substances," September 1960, pp. 58–61.

JULIUS FROME, *Primary Examiner.*

T. MORRIS, *Assistant Examiner.*